(12) United States Patent
Entani

(10) Patent No.: US 6,764,011 B2
(45) Date of Patent: Jul. 20, 2004

(54) GRAPHICS CODE SYSTEM

(75) Inventor: Naruto Entani, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 10/361,490

(22) Filed: Feb. 11, 2003

(65) Prior Publication Data

US 2003/0152229 A1 Aug. 14, 2003

(30) Foreign Application Priority Data

Feb. 13, 2002 (JP) ......................................... 2002-035039

(51) Int. Cl.$^7$ .............................................. G02B 26/10
(52) U.S. Cl. ........................ 235/462.25; 235/462.01; 235/462.08; 235/462.09; 235/462.12; 235/462.18; 235/462.32
(58) Field of Search ..................... 235/462.25, 462.01, 235/462.08, 462.09, 462.12, 462.18, 462.32, 494

(56) References Cited

U.S. PATENT DOCUMENTS

| | | | | |
|---|---|---|---|---|
| 5,204,515 A | * | 4/1993 | Yoshida | 235/456 |
| 5,298,731 A | * | 3/1994 | Ett | 235/462.02 |
| 5,619,027 A | * | 4/1997 | Ackley | 235/462.01 |
| 5,898,163 A | * | 4/1999 | Sato et al. | 235/472.01 |
| 6,024,289 A | * | 2/2000 | Ackley | 235/494 |
| 6,044,248 A | * | 3/2000 | Mochizuki et al. | 340/7.47 |

FOREIGN PATENT DOCUMENTS

| | | |
|---|---|---|
| JP | 60-3784 A | 1/1985 |
| JP | 5-342494 A | 12/1993 |
| JP | 6-342478 A | 12/1994 |
| JP | 9-149117 A | 6/1997 |
| JP | 2001-188846 A | 7/2001 |
| JP | 2001-202429 A | 7/2001 |
| JP | 2001-222483 A | 8/2001 |

* cited by examiner

Primary Examiner—Michael G. Lee
Assistant Examiner—Steven S. Paik
(74) Attorney, Agent, or Firm—Sughrue Mion, PLLC

(57) ABSTRACT

A bar code system is composed of a bar code display device 100 and a bar code reader 110. The bar code display device 100 has a operation unit 101 which divides transfer information to be transmitted into a plurality of pages of divisional information, converts them into bar codes, and successively displays the bar codes on a display unit 104. The bar code reader 110 has a operation unit 111 which converts bar codes successively read by a scanner 116 into divisional information, connects the divisional information, and restores the divisional information into transfer information.

6 Claims, 4 Drawing Sheets

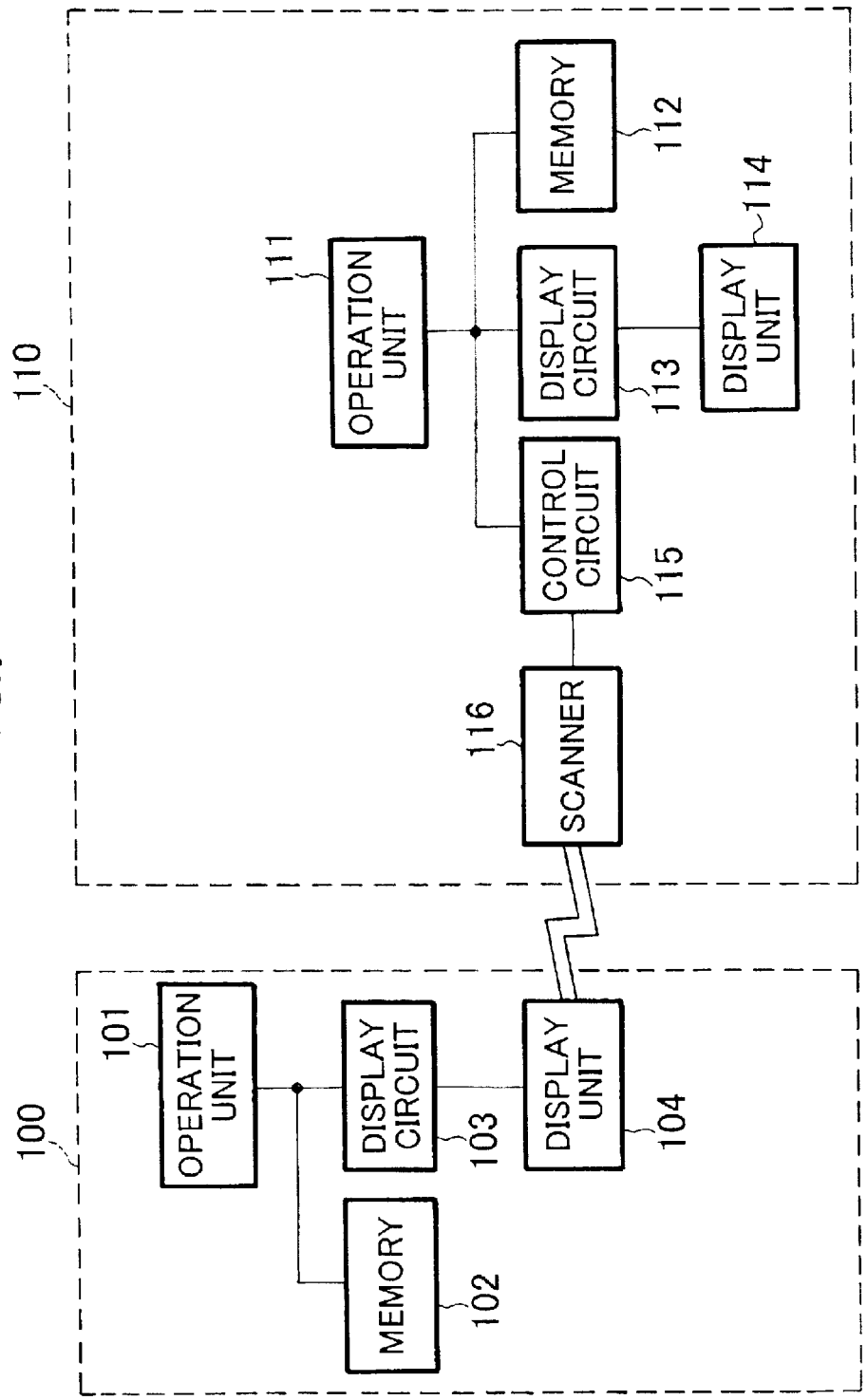

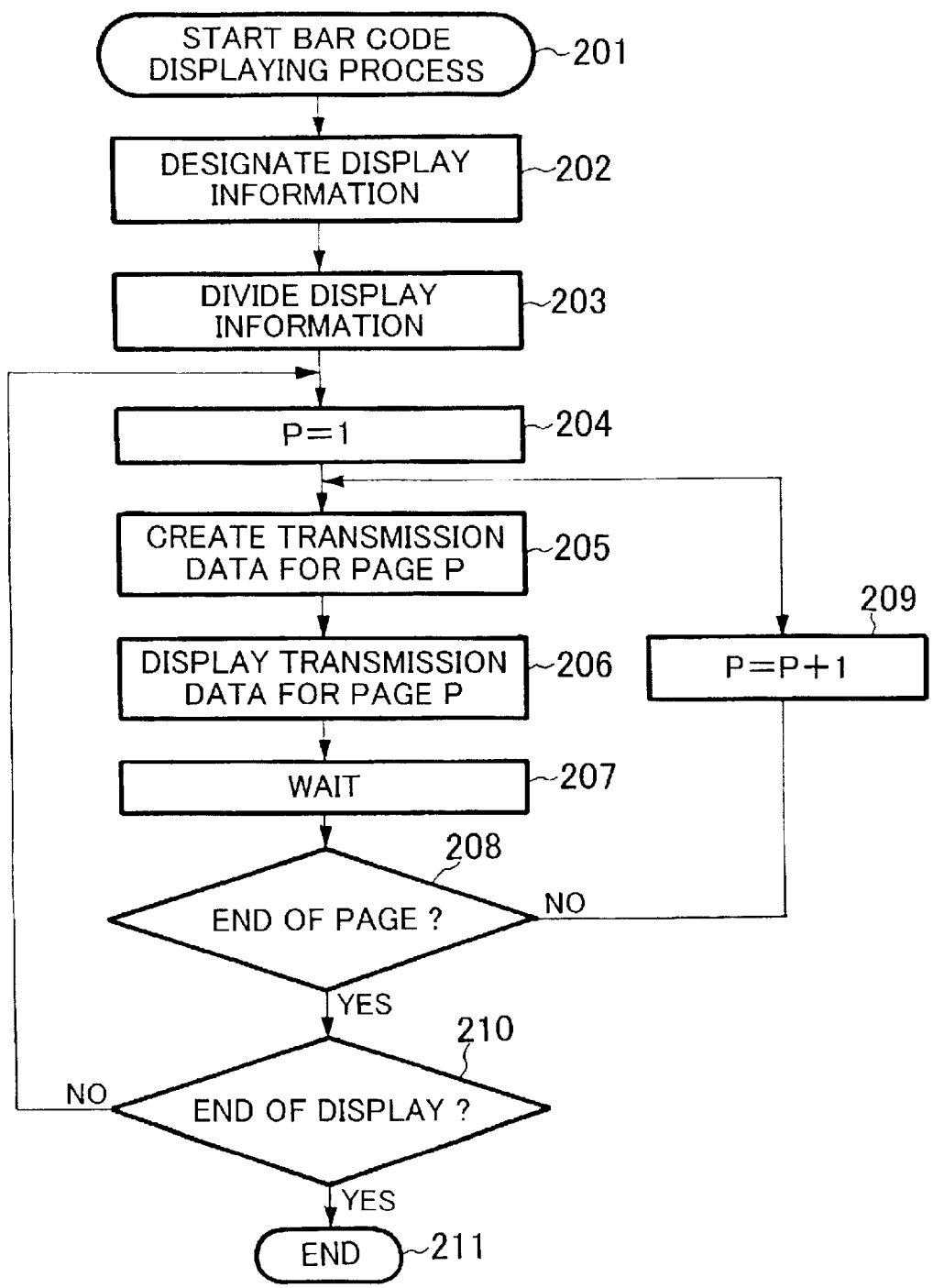

1311121314

2321222324

3331323334

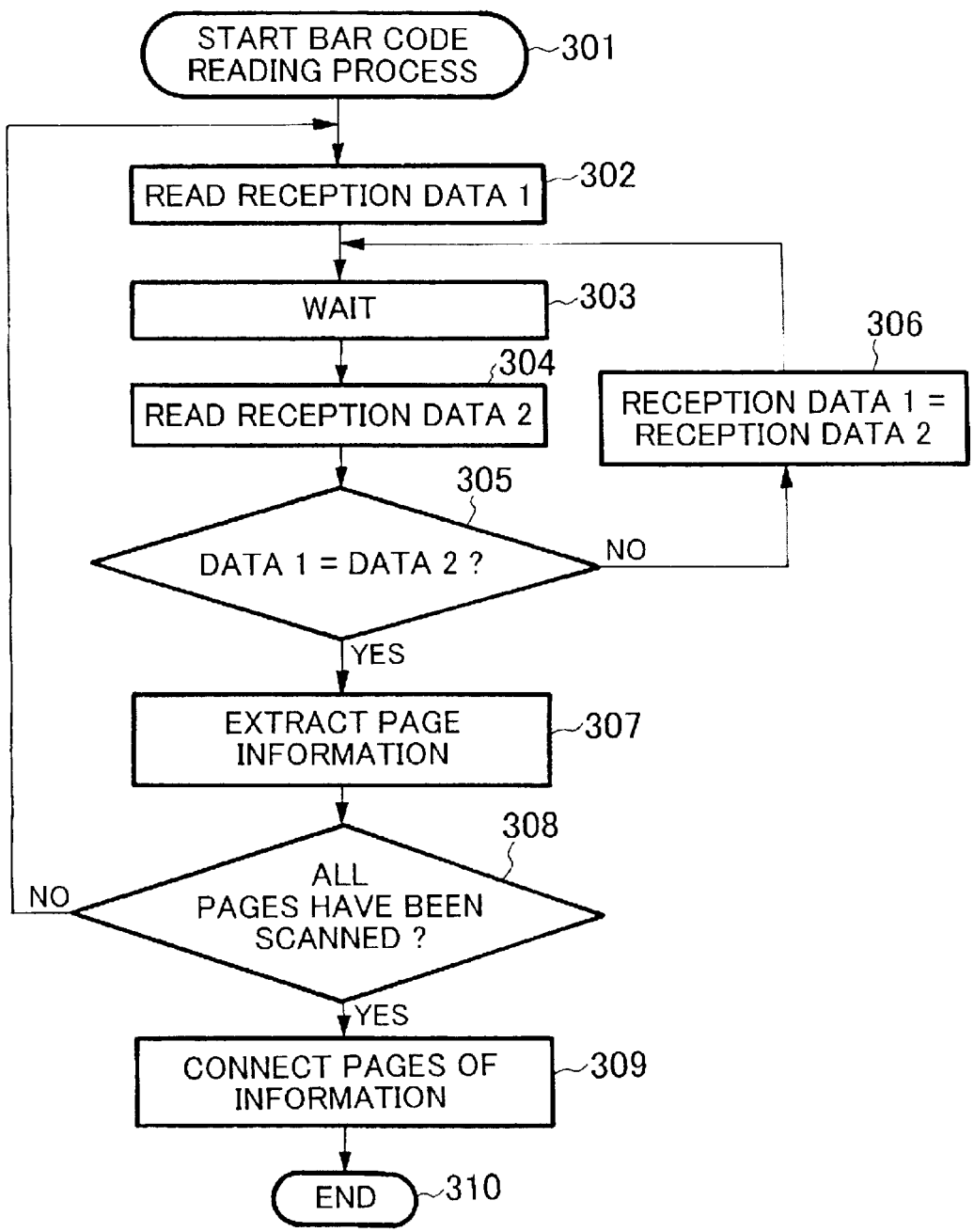

GRAPHICS CODE SYSTEM

BACKGROUND OF THE INVENTION

1. Field of the Invention

The present invention relates to a graphics code system for transferring information with a graphics code such as a bar code or a two-dimensional code.

2. Description of the Related Art

Since an information transferring means using a bar code can be displayed or read relatively with ease and at low cost, this means has been widely used in many applications including POS (Point Of Sales) management for stores. In the prior art references, for example, Japanese Patent Publication No. 2001-188846A and 2001-202429A, such a bar code information is displayed on the screen of a cellular phone unit, a portable information processing device, or the like. The bar code information is read by a bar code reader so that user's ID can be checked at an event hall or the like.

However, the amount of information which can be transferred with a bar code is limited. To represent a large amount of information with a bar code, it requires a large display area. The same problem will take place when other graphics codes are used.

SUMMARY OF THE INVENTION

An object of the present invention is to solve the forgoing problem and to provide a graphics code system which allows a relatively large amount of information to be transmitted with a display device having a small display area.

The present invention is a graphics code system comprising a graphics code display device for displaying a graphics code to be transferred, and a graphics code reader for reading a graphics code displayed on the graphics code display device, wherein the graphics code display device comprises a display unit for displaying a graphics code, and code division control means for dividing transfer information to be transmitted into a plurality of pages of divisional information, converting these pages of divisional information into graphics codes, and successively displaying the converted graphics codes on the display unit, and wherein the graphics code reader comprises reading means for successively reading graphics codes displayed on the display unit, and code restoration control means for converting each graphics code which has been read by the reading means into divisional information, connecting a plurality of pages of divisional information, and restoring them to the transfer information.

The graphics code display device according to the present invention is for example a computer or a cellular phone unit, and has a display unit which can freely display data. The graphics code display device divides transfer information into a plurality of portions and successively displays them. The graphics code reader reads graphics codes which are successively displayed, connects them, and restores them to the original transfer information.

In the graphics code system according to the present invention, the code division control means of the graphics code display device is configured to add control information composed of a number which represents the order of the plurality of pages of divisional information and the total number of pages of divisional information to each of the plurality of pages of divisional information. The code restoration control means of the graphics code reader is configured to judge whether or not all of the plurality of pages of divisional information have been read corresponding to the control information added to each of the plurality of pages of divisional information.

In the graphics code system according to the present invention, the code division control means of the graphics code display device is configured to add an error correction code to the transfer information which has not been yet divided and divide the resultant transfer information. The code restoration control means of the graphics code reader is configured to perform processes for error correcting and detecting the restored transfer information corresponding to the error correction code.

In the graphics code system according to the present invention, a graphics code reading time period of the graphics code reader is $1/3$ or smaller than a graphics code display changing time period of the graphics code display device.

In the graphics code system according to the present invention, the graphics code is a bar code.

In the graphics code system according to the present invention, the graphics code is a two-dimensional code.

These and other objects, features and advantages of the present invention will become more apparent in light of the following detailed description of preferred embodiments thereof, as illustrated in the accompanying drawings.

BRIEF DESCRIPTION OF DRAWINGS

FIG. 1 is a block diagram showing the structure of a bar code system according to a first embodiment of the present invention;

FIG. 2 is a flow chart showing an operation of a bar code display device according to the first embodiment of the present invention;

FIG. 4 is a flow chart showing an operation of a bar code reader according to the first embodiment of the present invention.

DESCRIPTION OF PREFERRED EMBODIMENTS

Figure 3A:
FIGS. 3A to 3C are schematic diagrams showing examples of transmission data and bar codes which represent transmission data.

Next, with reference to the accompanying drawings, embodiments of the present invention will be described in detail.

[First Embodiment]

FIG. 1 is a block diagram showing the structure of a bar code system according to a first embodiment of the present invention. The bar code system according to the first embodiment of the present invention is composed of a bar code display device 100 and a bar code reader 110.

The bar code display device 100 is a conventional information processing device or a cellular phone unit. The bar code display device 100 is composed of an operation unit 101, a memory 102, a display circuit 103, and a display unit 104. The operation unit 101 which is code division control means successively processes information corresponding to an execution program defined in the memory 102 and causes the display circuit 103 to display required content on the display unit 104.

Likewise, the bar code reader 110 is a conventional information processing device. The bar code reader 110 is provided with an operation unit 111, a memory 112, a display circuit 113, and a display unit 114. A scanner 116 which is reading means is connected to the bar code reader 110 through a control circuit 115. The operation unit 111 which is a code restoration control means successively processes information corresponding to an execution program defined in the memory 112 and causes the display circuit 113 to display required content on the display unit 114. In addition, the operation unit 111 causes the control circuit 115 to read bar code information through the scanner 116.

Next, with reference to FIG. 2, an operation of the first embodiment of the present invention will be described. First of all, an operation of the bar code display device 100 will be described. FIG. 2 is a flow chart showing the operation of the bar code display device 100. When the operation unit 101 executes the program defined in the memory 102, a bar code displaying process according to the present invention starts (at step 201 shown in FIG. 2).

It is assumed that transfer information to be transmitted to bar code reader 110 has been designated. In addition, it is assumed that the transfer information is a 24-character string in decimal notation "111213142122232431323334" and has been stored in the memory 102 (at step 202). According to the first embodiment of the present invention, the amount of information which can be represented with a bar code which can be displayed at a time on the display unit 104 is a 10-character string in decimal notation.

As will be described later, two-character control information has been added to transmission data represented with a bar code. Thus, the practical amount of information represented with one bar code displayed at a time is an eight-character string in decimal notation. The operation unit 101 divides the 24-character string stored in the memory 102 into three groups composed of eight-character strings so that all the 24-character string is transmitted (at step 203). As a result, the 24-character string is divided into three character strings "11121314", "21222324", and "31323334". For easy description, the first character string "11121314" is referred to as divisional information of page 1, the second character string "21222324" as divisional information of page 2, and the third character string "31323334" as divisional information of page 3.

As a variable (page number) for managing the display order of each page of the divisional information, P has been provided. At first, the operation unit 101 assigns 1 to the variable P (at step 204). Next, the operation unit 101 creates transmission data corresponding to the variable P (at step 205). The operation unit 101 creates transmission data by adding control information composed of the variable P and the number of pages necessary for transferring all the divisional information at the head of the divisional information corresponding to the variable P. In this example, since the variable P is 1, the number of pages necessary for transferring all the divisional information is 3, and the divisional information corresponding to variable P=1 is "11121314", the transmission data corresponding to the variable P is "1311121314".

Figure 3B:
Figure 3C:

Next, the operation unit 101 converts the created transmission data into a bar code corresponding to a predetermined rule and causes the display circuit 103 to display the bar code on the screen of the display unit 104 (at step 206). The transmission data "1311121314" and an example of the bar code which represents the transmission data are shown in FIG. 3A. Bar codes shown in FIGS. 3A to 3C are just examples, not those which have been converted and created corresponding to a predetermined rule.

The operation unit 101 continues to display the bar code for a predetermined time period (at step 207). After the predetermined time period has elapsed, the operation unit 101 judges whether or not all the pages have been displayed (at step 208). At that point, since the pages 2 and 3 have not been yet displayed, the flow advances to step 209. The operation unit 101 increments the variable P by 1 (at step 209). Thereafter, the flow returns to step 205. At that point, the operation unit 101 increments the variable P by 1. Thus, the variable P becomes 2.

At step 205, the operation unit 101 creates transmission data corresponding to P=2. At that point, since the variable P is 2, the total number of pages is 3, and divisional information corresponding to variable P=2 is "21222324", transmission data corresponding to the variable P is "2321222324". The operation unit 101 converts the created transmission data into a bar code and displays the bar code on the screen of the display unit 104 (at step 206). The transmission data "2321222324" and an example of the bar code which represents the transmission data are shown in FIG. 3B.

The operation unit 101 continues to display the bar code for a predetermined time period (at step 207). After the predetermined time period has elapsed, the operation unit 101 judges whether or not all the pages have been displayed (at step 208). At that point, since page 3 has not been yet displayed, the flow advances to step 209. The operation unit 101 increments the variable P by 1 (at step 209). Thereafter, the flow returns to step 205.

At step 205, the operation unit 101 creates transmission data corresponding to variable P=3. At that point, since variable P is 3, the total number of pages is 3, and divisional information corresponding to variable P=3 is "31323334", transmission data corresponding to the variable P is "3331323334". The operation unit 101 converts the created transmission data into a bar code and displays the bar code on the screen of the display unit 104 (at step 206). The transmission data "3331323334" and an example of the bar code which represents the transmission data are shown in FIG. 3C.

The operation unit 101 continues to display the bar code for a predetermined time period (at step 207). After the predetermined time period has elapsed, the operation unit 101 judges whether or not all the pages have been already displayed (at step S208). Since all pages 1 to 3 have been already displayed, the judged result at step 208 is Yes. Thereafter, the flow advances to step 210.

At step 210, the operation unit 101 judges whether to stop displaying the transmission data. There are some display stop conditions. As one display stop condition, a time period designated to the bar code reading process has elapsed. As another display stop condition, the operator of the bar code display device 100 has input a display stop command.

When no display stop condition has been satisfied, the flow returns to step 204. Unless any display stop condition has not been satisfied, steps 204 to 210 are repeated. As a result, the bar codes shown in FIGS. 3A, 3B, and 3C are repeatedly displayed on the screen of the display unit 104. When any display stop condition has been satisfied at step 210, the operation unit 101 ends the process (at step 211).

Next, an operation of the bar code reader 110 will be described. A conventional laser scan type bar code reader has a function for scanning a bar code which is approached to a reading portion of the reader and reading contiguous lines of the bar code. The scanner 116 according to the first embodiment of the present invention uses a bar code reader having such a function.

FIG. 4 is a flow chart showing an operation of the bar code reader 110. When the operation unit 111 executes the program defined in the memory 112, the bar code reading process according to the present invention is started (at step 301 shown in FIG. 4).

First of all, the scanner 116 reads a bar code displayed on the screen of the display unit 104 of the bar code display device 100. The operation unit 111 converts bar code information supplied from the scanner 116 through the control circuit 115 into a character string corresponding to a predetermined rule. The operation unit 111 stores the character string as reception data 1 in the memory 112 (at step 302).

After a predetermined time period has elapsed (at step 303), the scanner 116 again reads a bar code. The operation unit 111 converts the bar code information supplied from the scanner 116 through the control circuit 115 into a character string and stores the character string as reception data 2 in the memory 112 (at step 304). Next, the operation unit 111 compares the reception data 1 with the reception data 2 and judges whether or not they are the same (at step 305).

When the reception data 1 is not the same as the reception data 2, the flow advances to step 306. At step S06, the operation unit 111 copies the content of the reception data 2 to the reception data 1. Thereafter, the flow returns to step 303. After a predetermined time period has elapsed (at step 303), the scanner 116 again reads a bar code. The operation unit 111 converts bar code information supplied from the scanner 116 through the control circuit 115 into a character string and stores the character string as reception data 2 in the memory 112 (at step 304). Until the reception data 1 becomes the same as the reception data 2, the processes of steps 303 to 306 are repeated.

As was described above, since bar codes are successively changed on the screen, there is a possibility that data which has been read by the scanner 116 at a changing timing of a bar code displayed on the screen is incorrect data. Thus, it is necessary to eliminate the incorrect data. To do that, according to the first embodiment of the present invention, each bar code is read at least twice in succession. Only when the reception data 1 matches the reception data 2, the operation unit 111 judges that the bar code has been correctly read.

A bar code display changing time period for which the bar code display device 100 changes a page of a bar code to another page depends on the predetermined time period as a waiting time period at step 207. A bar code reading time period for which the bar code reader 110 reads a bar code depends on the predetermined time period as a waiting time period at step 303. When the bar code reading time period is ⅓ or smaller than the bar code display changing time period, with the reading operation performed at least three times, there is a chance of which the reception data 1 becomes the same as the reception data 2. Thus, the reading operation can be effectively executed.

When the reception data 1 is the same as the reception data 2 at step 305, the flow advances to step 307. The operation unit 111 has recognized that the first digit of the reception data is the variable P (page number), the second digit is the total number of pages, and the other digits are divisional information. The operation unit 111 extracts the variable P (page number) from the first digit of the reception data 1, the total number of pages from the second digit of the reception data 1, and the divisional information from the other digits of the reception data 1 (at step 307).

Next, the operation unit 111 judges whether or not all the pages have been already read (at step 308). With reference to the total number of pages and the page number which have been extracted, the operation unit 111 can judge whether or not all the pages have been already read. At that point, since only one page of the bar code has been read and three pages of the bar codes should be read for restoring them to information to be received, the judged result at step 308 is No. Thereafter, the flow returns to step 302. Until bar code information of the remaining pages has been successively read, the processes of steps 302 to 308 are repeated.

After all the pages have been already read, the judged result at step 308 becomes Yes. The operation unit 111 successively connects the divisional information of the page number 1, the divisional information of the page number 2, and the divisional information of the page number 3. As a result, the operation unit 111 restores them to the original transfer information (at step 309). In such a manner, information transmitted from the bar code display device 100 can be received by the bar code reader 110.

[Second Embodiment]

The operation unit 101 of the bar code display device 100 according to the first embodiment may add an error correction code (ECC) to original transfer information and divides the resultant transfer information into a plurality of pages of divisional information. When the operation unit 111 of the bar code reader 110 restores the received divisional information to the original transfer information, with the error correction code restored concurrently, the operation unit 111 may perform an error correcting and detecting process. As a result, information can be more accurately transferred.

According to the first and second embodiments, a bar code system using a bar code was described. However, the present invention is not limited to such a system. Instead, the present invention can be applied for other graphics code systems for example a two-dimensional code system. The two-dimensional code system uses a two-dimensional code instead of bar codes used in the first and second embodiments.

According to the present invention, the graphics code display device divides transfer information into a plurality of pages of divisional information, converts them into graphics codes, and successively displays converted graphics codes on the display device. The graphics code reader converts each graphics code which has been read by a reading means into a plurality of pages of divisional information, connects them, and restores them to the original transfer information. Thus, even if the graphics code display device has a small display area, the device can transmit a relatively large amount of information.

In addition, the code division control means of the graphics code display device is configured to add control information composed of a number which represents the order of the plurality of pages of divisional information and the total number of pages of divisional information to each of the plurality of pages of divisional information. Even if graphics codes which are successively displayed are read in the middle, since the code restoration control means of the graphics code reader is configured to judge whether or not all of the plurality of pages of divisional information have been read corresponding to the control information added to each of the plurality of pages of divisional information, information can be effectively transferred.

In addition, the code division control means of the graphics code display device is configured to add an error correction code to the transfer information which has not been yet divided and divide the resultant transfer information. The code restoration control means of the graphics code reader is configured to perform an error correcting and detecting process for the restored transfer information corresponding to the error correction code. Thus, information can be more accurately transferred.

In addition, a graphics code reading time period of the graphics code reader is ⅓ or smaller than a graphics code display changing time period of the graphics code display device. Thus, reading efficiency of graphics codes can be improved.

Although the present invention has been shown and described with respect to preferred embodiments thereof, it should be understood by those skilled in the art that the foregoing and various other changes, omissions, and additions in the form and detail thereof may be made therein without departing from the spirit and scope of the present invention.

What is claimed is:

1. A graphics code system comprising a graphics code display device for displaying a graphics code to be transferred, and a graphics code reader for reading the graphics code displayed on said graphics code display device, wherein said graphics code display device comprises:
    a display unit for displaying the graphics code; and
    code division control means for dividing transfer information to be transmitted into a plurality of pages of divisional information, converting said plurality of pages of divisional information into graphics codes, and
successively displaying the converted graphics codes on said display unit, and wherein said graphics code reader comprises:
    reading means for successively reading the graphics codes displayed on said display unit; and
    code restoration control means for converting each graphics code which has been read by said reading means into divisional information, connecting a plurality of pages of divisional information, and restoring them to the transfer information.

2. The graphics code system as set forth in claim 1, wherein said code division control means of said graphics code display device is configured to add control information composed of a number which represents the order of the plurality of pages of divisional information and the total number of pages of divisional information to each of the plurality of pages of divisional information, and wherein said code restoration control means of said graphics code reader is configured to judge whether or not all of the plurality of pages of divisional information have been read corresponding to the control information added to each of the plurality of pages of divisional information.

3. The graphics code system as set forth in claim 1, wherein said code division control means of said graphics code display device is configured to add an error correction code to the transfer information which has not been yet divided and divide the resultant transfer information, and wherein said code restoration control means of said graphics code reader is configured to perform processes for error correcting and detecting the restored transfer information corresponding to the error correction code.

4. The graphics code system as set forth in claim 1, wherein a graphics code reading time period of said graphics code reader is ⅓ or smaller than a graphics code display changing time period of said graphics code display device.

5. The graphics code system as set forth in claim 1, wherein the graphics code is a bar code.

6. The graphics code system as set forth in claim 1, wherein the graphics code is a two-dimensional code.

* * * * *